April 27, 1965          W. J. BISCHOF          3,181,055

DIFFERENTIAL-TRANSFORMER DISPLACEMENT-TRANSDUCER

Filed July 24, 1961

WALTER JAMES BISCHOF
INVENTOR.

BY

United States Patent Office 3,181,055
Patented Apr. 27, 1965

3,181,055
DIFFERENTIAL-TRANSFORMER DISPLACE-
MENT-TRANSDUCER
Walter J. Bischof, Costa Mesa, Calif., assignor to
Bourns, Inc.
Filed July 24, 1961, Ser. No. 126,171
8 Claims. (Cl. 323—51)

The present application pertains to motion-responsive transducer means, and more particularly the invention pertains to a device for providing an accurate electrical indication of the extent and direction of motion of a movable member.

In many types of mechanisms and apparatus it is desirable to have available at a particular location an indication of the extent and direction of motion of a member situated at a different location. Many types of devices have been devised for performing the stated function; for example, mechanical connections such as Bowden cables, and electromechanical transducers including differential transformer means having a movable core responsive to movement of the member under surveillance and effective to cause variance in the outputs of a pair of secondary windings as a suitable core-linking primary is energized. It is to the latter class of devices that the present invention is directed.

Prior-art devices of the class here concerned have in general consisted essentially of a solenoid-like primary coil through the interior of which a ferromagnetic core is arranged to be translated, a pair of secondary windings each arranged as an extension from a respective half of the primary coil, and demodulating (rectifier-filter) networks each connected across a respective secondary winding with the two networks connected in "back-to-back" relation. The two rectified outputs of the secondary circuits thus are of the same polarity at any given time, and the amplitude varies in accord with the displacement of the core from a null position, and the output polarity is dependent upon the direction of core-displacement from the null position. The prior art arrangement is satisfactory for applications wherein the load into which the circuit of the device is connected is indefinitely large or "infinite"; but in cases where the resistance of the load is relatively low or lowered, an appreciable current-flow occurs through the load from the high potential side to the low potential side of the demodulator networks, producing in effect a counter E.M.F. across one of the filter networks. At the extreme translation or travel of the core, the thus produced counter E.M.F. may in fact exceed the demodulated potential for a particular secondary, and under that circumstance the indicated potential at the "low" side of the demodulator will rather sharply increase rather than decrease, so that the output voltage of the transducer suddenly decreases and is non-linear. Thus at the extreme of core movement the instrument or apparatus is inaccurate and useless.

The present invention overcomes the noted difficulty encountered in operation of the prior art differential transformer transducers, by providing means for keeping the demodulated voltage on the low side of the network always higher than the counter E.M.F. While that result could be attained by increasing the core length and core travel, such an expedient is extremely undesirable since the dimensions of the instrument are in that way greatly increased. The present invention accomplishes the desired result without increasing the overall dimensions of the prior art transformer, by adding superposed over the primary winding, auxiliary secondary windings each connected in series with a respective one of the principal secondary windings. The effect of that addition or change is to provide in either secondary demodulator circuit, at all times, during operation of the transducer, a potential in excess of the counter E.M.F. that may be produced therein. Details of the prior art device and those of apparatus according to the instant invention will be fully set forth hereinafter.

The preceding brief description of the invention makes evident that a principal object of the invention is to provide improvements in differential-transformer motion (displacement) transducers adapted for providing electrical indications of relative direction and magnitude of movements of a physical device.

Another object of the invention is to provide a differential-transformer transducer that is free from adverse counter E.M.F. effects.

Another object of the invention is to provide means for improving linearity of output of a differential-transformer motion or displacement transducer.

Another object is to optimize the construction of a differential-transformer motion-transducer within predetermined dimensions in the direction of the motion to be transduced.

Other objects and advantages of the invention will hereinafter be made apparent in the appended claims and in a description of a preferred physical form of apparatus according to the invention as illustrated in the accompanying drawings.

Figure 1:
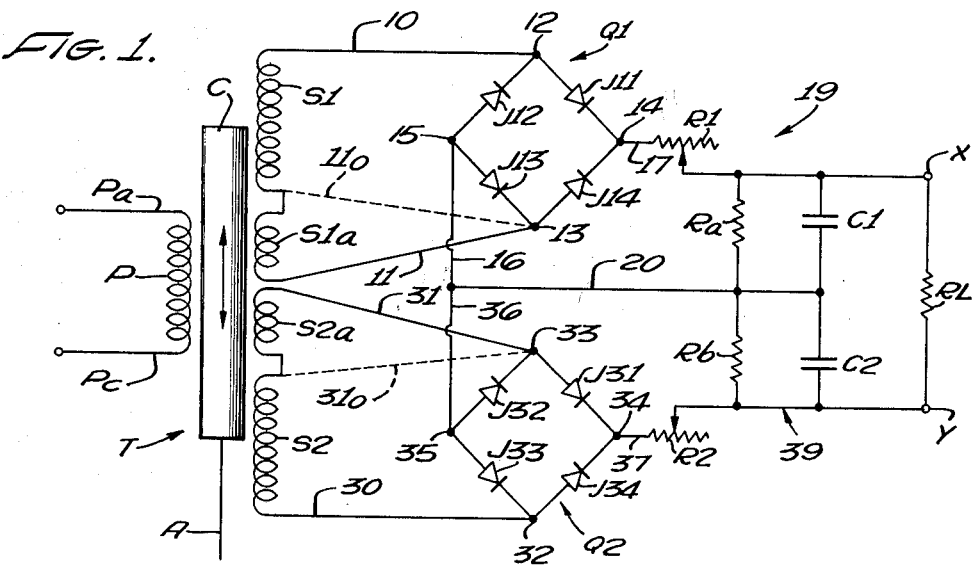
FIG. 1 is a schematic diagram of the electrical components of a device according to the invention, without attention to proportions of parts.

There is illustrated in FIG. 1 a transformer T comprising a primary winding P, a first secondary winding S1, a second secondary winding S2, a first auxiliary secondary winding S1a, a second auxiliary secondary winding S2a, and a movable ferromagnetic core C. As depicted, windings S1 and S1a are connected in series-aiding relationship, and the series combination is connected by conductors 10 and 11 to respective junctions 12 and 13 of a rectifier network Q1 composed essentially of rectifier units J11, J12, J13 and J14. The other two junctions, 14 and 15, are by respective conductors 17 and 16 connected across a filter network 19 comprising an adjustable resistor R1 and a fixed-value resistor Ra, and a capacitor C1. Similarly, secondary windings S2 and S2a are connected in series-aiding relationship, and that series-combination is connected by conductors 30 and 31 to junctions 32 and 33 of a rectifier network Q2 composed essentially of rectifier units J31, J32, J33 and J34. The other two junctions, 34 and 35, of network Q2, are connected by respective conductors 37 and 36 to a filter network 39 comprising an adjustable resistor R2 and a fixed-value resistor Rb, and a capacitor C2. A common return line, 20, is connected as indicated to the two filter networks and to the two rectifier networks, to dispose the two sets of networks in back-to-back relationship. Connected across the two filter networks 19 and 39, and here representing an indicator device or a control device of types well known in the electrical arts, is a load device represented by a resistance RL.

Figure 2:
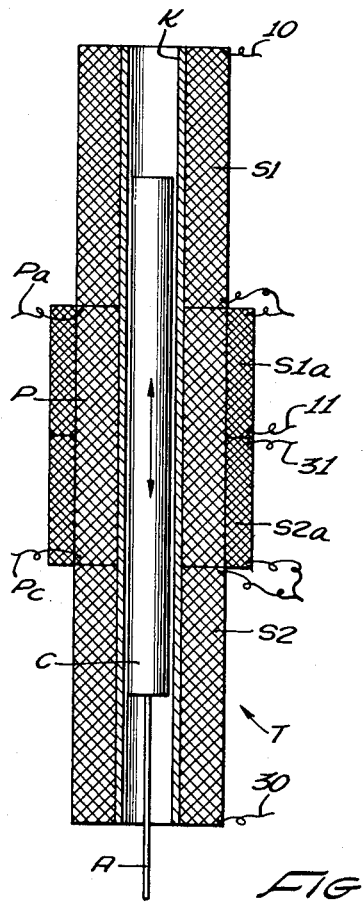
FIG. 2 is a view in longitudinal section of a device embodying principles of the invention.

Referring now to FIG. 2, there is illustrated a preferred geometrical arrangement or disposition of the windings P, S1, S1a, S2 and S2a, and core C. In that drawing the windings P, S1 and S2 are shown wound upon or over a mandrel or tube K, the primary winding P occupying a central portion of the tube and the secondary windings S1 and S2 being wound over the tube K beyond respective ends of the primary winding, as may be customary in producing differential-transformer motion-transducers. Disposed for translation to-and-fro in the tube K is the forro-magnetic core C, which is of a length in excess of the length of primary P and determined in a manner hereinafter explained. The auxiliary secondary windings S1a and S2a are according to the invention wound upon or disposed over respective half-lengths of primary P, as indicated. Tube K is made of sufficient length to accommodate the full expected range of translatory movements of core C. In general, the instrument may be usually adapted for equal semi-ranges of movement of core C from a null position; however, as will be evident to those skilled in the art, the design may be such as to provide for unequal ranges of motion of the core from null position, and in that case tube K and an appropriate one of the auxiliary secondary windings may be shortened.

In operation, with core C at the center or null position indicated and with the primary winding P energized by application of a source of A.C. power through leads Pa and Pc, potentials are induced in secondary windings S1 and S1a. The produced potentials, added, are applied to junctions 12 and 13 of network Q1 and there rectified to produce a potential having a large D.C. component and a small A.C. component, evident across junctions 14 and 15. The thus produced potential is filtered by the filter network 19 to remove the A.C. component, and the D.C. component appears between load terminal X and return line 20. Similarly, potentials of polarity opposite to those induced in windings S1 and S1a are induced in secondary windings S2 and S2a; and similarly, the sum of these potentials is applied to rectifier network Q2 and the rectified output is filtered by network 39. That filtered potential appears between load terminal Y and line 20, in opposition to the potential appearing between the terminal X and line 20. With the core C in the null position, the circuits are balanced by adjustment of resistors R1 and R2 so that no current flows through the indicator or load resistor RL.

Upon displacement of core C from the null position the circuits become unbalanced, one providing an increasing or higher potential and the other providing a decreasing or lower potential, the result of which is a flow of current in one direction or the other through resistor RL. For example, when the core is translated from the null position in which it is depicted in FIG. 2, toward the upper (as shown) end of tube K, the potential induced in secondary S1 will increase, while that induced in secondary S2 will decrease; and the result will be an increase in the potential at terminal X and a decrease in that at terminal Y, relative to return line 20. Hence there will ensue a current through RL from X to Y. Thus an indication, mathematically related to the extent of translation of the core, and indicative (by its direction) of the direction of the translation of core C is furnished by the current. That indication is in turn utilized to furnish a sense-perceptible indication (as by a meter device) or to effect a control function, as may be well known in the art. A similar action occurs upon translation of the core in the opposite direction from the null position, the direction of the current through RL then being reversed and the indicator then indicating translation of the core in the opposite (downward as shown) direction.

It will be understood that the core C may be moved within tube K by any suitable means. As depicted in the drawings, movement is accomplished by a slender resilient non-magnetic rod A that is secured to the lower end of the core by adhesive or other suitable means.

Figure 3:
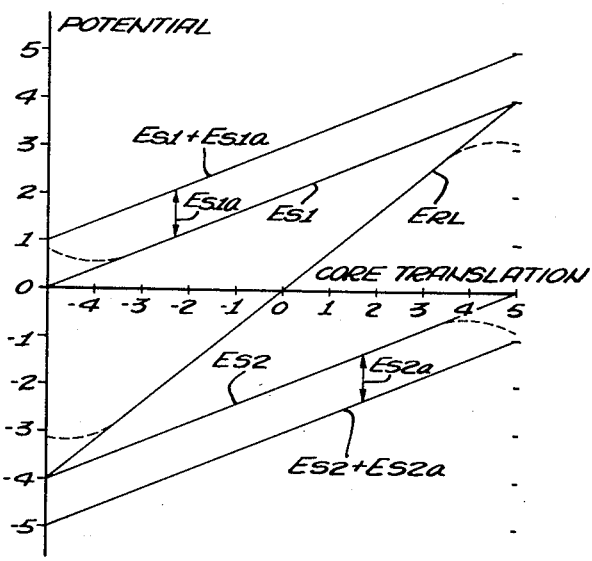
FIG. 3 is a graphical representation of characteristics of prior art devices compared with those of a device according to the invention.

The difference between the prior art device and the improved transformer-transducer of the present invention may be explained with reference to FIGS. 1 and 3. An explanation of the operation of the prior art device (which did not comprise auxiliary secondary windings S1a and S2a) will be made first, with an indication of the undesired results attending operation of that device. In FIG. 3, there are graphically indicated, coordinates of core movement or translation, and electric voltage or potential. The core-translation axis (abscissa) indicates a null position of the core as zero, and arbitrary positive and negative units of movement from the null position. Also, the potentials, depicted as ordinates, range from zero in both positive and negative values. It is desired that the potential appearing across the indicator terminals X and Y be linear throughout the entire range of motion of the core, which range as herein represented is composed of equal half ranges from 0 to 5 and from 0 to —5 of arbitrary units. The potential that it is desired to be produced across terminals X and Y is represented as $E_{RL}$ (potential across $R_L$) and is a straight line on the chart. Attainment of a linear potential coincident with values of graph $E_{RL}$ was readily accomplished by the prior art device, through the middle of the range of core translation; but, with a value of $R_L$ much less than infinitely large, the potential between terminals X and Y falls rapidly toward zero as the translation of the core approaches the end of its range in either direction. The falling off of the potential, indicated by the dotted lines at the ends of graph $E_{RL}$, resulted from the substantially linear rectified potential outputs of the secondary windings (indicated by graphs $E_{S1}$ and $E_{S2}$) being overcome by the IR drop produced across resistor $Rb$ (or $Ra$) by the load current through $R_L$. That is, as the core approached either extreme from null position the IR drop from the load-resistor current became sufficiently high to back-bias the rectifier circuit (Q1 or Q2) to the point where no rectified output appeared across the filter network (19 or 39). At that point, linearity of the potential across the load was no longer possible.

In the case of the present invention, by the addition of secondary windings S1a and S2a, additional potential is induced and supplied to each of the rectifier networks, by those windings. The additional potential is represented, for network Q1, by the quantity $E_{S1a}$, and for network Q2, by $E_{S2a}$. Each of those potentials, when added to the potential induced in the respective principal secondary winding, has the effect of preventing the back-biasing of the respective rectifier network, since each is added to the potential induced in the respective principal secondary winding. Since the core is always within both of the auxiliary secondary windings, the potentials $E_{S1a}$ and $E_{S2a}$ are always equal and hence do not change the slope (rate of change of $E_{RL}$ per unit of core translation) of the desired potential across terminals X and Y. That is made clear in FIG. 3, wherein it is evident that $E_{RL}$ is always equal to the algebraic sum of $E_{S2}+E_{S2a}$ and $E_{S1}+E_{S1a}$. Also indicated in FIG. 3 is the fact that the rapid rise of $E_{S2}$ or $E_{S1}$, and the consequent falling-off or doop of $E_{RL}$, does not occur. That is due to the prevention of back-biasing to non-conduction, of either of the filter networks. Accordingly, potential $E_{RL}$ is linear throughout the entire range of motion of core C. As indicated in FIG. 1, in the prior art device the interior end of secondary S1 was connected by a removed conductor (represented by dotted-line 11o) to junction 13; and similarly the inner end of secondary S2 was connected by a removed conductor (represented by dotted-line 31o) to junction 33. Also, it is evident that as the core neared either extreme of translation the core was substantially removed from the opposite coil (S1 or S2) so that the potential induced in the latter was very low.

It is evident from the preceding description and explanation that the magnitude of potentials $E_{S1a}$ and $E_{S2a}$ required to be generated by the respective auxiliary secondary windings in order to obviate troublesome back-biasing of the respective rectifier networks, is dependent upon the magnitude of the maximum current through $R_L$ and the values of resistors $Ra$ and $Rb$ across which the detrimental back-biasing potentials are evidenced. Accordingly, the auxiliary secondary windings are designed to accommodate indicators having the lowest $R_L$ value that may be contemplated for use with the transducer. For optimum dimensional, characteristics (minimum transducer length) for a required core translation or displacement L, the core length should be 2L plus the length of the primary P, and each principal secondary should be of length L. The auxiliary secondary windings may be concentrated at the center of the primary, or each distributed over a respective half of the primary as illustrated.

The preceding description and explanation make it evident that the present invention provides improvements in linearity of output of a differential-transformer displacement-transducer, and that the other stated and claimed objectives of the invention are attained. Further, it is evident that with the present disclosure in view, various modifications and changes within the true spirit and scope of the invention will occur to those skilled in the art; and accordingly it is not desired to limit the invention to the precise details of the exemplary physical embodiment illustrated, but I claim:

1. A differential-transformer displacement-transducer, comprising:
   first means, comprising a tubular primary winding and first and second tubular principal secondary windings each aligned and coaxial with the primary winding and each in end to end abutting relation and extending away from a respective end of the primary winding;
   second means, comprising first and second auxiliary secondary windings each disposed over a respective half of said primary winding and coaxial therewith and each connected in series with a respective principal secondary winding;
   third means, comprising a translatory core of length in excess of the axial length of said primary winding disposed in said tubular windings and displaceable therein from a null position in either direction to a corresponding extreme position; and
   fourth means, comprising first and second demodulator-filter networks, each connected to be energized by a respective one of said principal and auxiliary secondary windings and being connected in back-to-back relationship across a load,
   whereby as said core is moved to an extreme position relative to said windings the potential generated in either of said auxiliary secondary windings prevents back-biasing of the corresponding demodulator network by load-current potential-drop through the corresponding demodulator filter network, to thus maintain linearity of output potential throughout the range of movement of said core.

2. A differential-transformer displacement-transducer comprising:
   electrical network means, including load-resistance means, constructed and arranged to receive first and second individual opposed alternating potentials and to energize in either of opposite directions said load resistance means dependent upon the relative magnitudes of the received alternating potentials;
   transformer-winding means comprising a primary winding and first and second principal secondary windings disposed in abutting relation with said primary winding at respective ends thereof and respectively connected in bucking relationship to provide first and second individual opposed alternating potentials to said electrical network means to produce a load current in said load resistance and a resultant potential drop in said network means;
   means including a core of length greater that that of said primary winding and movable in said transformer winding means and effective incident to movement from a null position therein to cause said first and second individual alternating potentials to be unequal;
   and means, including auxiliary secondary winding means disposed over and coaxial with said primary winding to be inductively linked with said core and connected in series with respective ones of said principal secondary windings and to said network means and effective in extreme positions of said core in said winding means to produce a potential in excess of said potential drop.

3. Displacement-transducer means comprising:
   first means, including a differential transformer comprising a primary winding means and first and second physically opposed spaced-apart secondary winding means each inductively linked with said primary, and a core means of length greater than that of said primary winding movable in said windings from a null position to either of extreme positions either providing increased flux-linkage with one secondary winding and decreased flux-linkage with the other thereof; and
   second means, comprising first and second opposed rectifier-filter demodulator circuits connected back to back and each connected for energization by a respective one of said secondary winding means, and means including a resistive means connected between said circuits and arranged to conduct electric current as a result of unbalance of energization of said demodulator circuits,
   said first and second secondary winding means comprising first and second principal secondary windings extending away from respective ends of said primary winding means and each comprising first and second auxiliary secondary winding means superposed upon respective half-portions of said primary winding means and each connected in series with a respective one of said principal secondary windings.

4. For a differential-transformer displacement-transducer, a transformer comprising:
   a straight tubular primary having first and second ends, a first straight tubular secondary abutting against and extending away from one end of the tubular primary and coaxial with the latter, a second straight tubular secondary abutting against and extending away from the second end of the tubular primary and coaxial with the latter, and an elongate core of length approximating that of the combined lengths of said primary and the longest of the secondaries and disposed within said primary and at least one of said first and second secondaries and translatable axially therein in either direction from a null position to either of opposite extreme positions, said first and second secondary being connected in opposition;
   and first and second auxiliary secondaries, each superposed over an extent of a respective half of said tubular primary and each connected in series with a respective one of said first and second tubular secondaries, whereby in either extreme position of said core the core is disposed partly within said primary and partly in a respective one of said first named secondaries.

5. A transformer as specified in claim 4, said primary first and second tubular secondaries and said core being related according to the equations:

$$L_s = S_s$$

and $$L_c = L_p + L_s$$

wherein $L_s$ is the length of either tubular secondary, $S_s$ is the distance of movement or displacement of the core from one extreme position to the opposite extreme position, $L_c$ is the length of the core, and $L_p$ is the length of the primary.

6. A differential transformer comprising:
   first and second generally axially-aligned tubular secondary windings spaced apart to provide a winding-space therebetween;

first means, comprising a primary winding and first and second auxiliary secondary windings wound around the exterior of respective end portions of said primary winding, arranged in generally tubular form and disposed in said winding-space in substantially axial alignment with said secondary windings and abutting against the adjacent ends thereof;

second means, comprising a translatory core of length greater than that of said primary winding and greater than that of either secondary winding, arranged within and for displacement in said first means between first and second extreme positions therein;

and electrical connection means, including means connecting said first tubular secondary winding in series with one of said auxiliary secondary windings and connecting said second tubular secondary in series with the other one of said auxiliary secondary windings.

7. A differential-transformer motion-transducer comprising:

first means, comprising a tubular structure comprising first and second spaced-apart tubular secondary windings arranged in axial alignment;

second means, comprising a primary winding and first and second auxiliary windings forming a tubular structure interposed between and abutting against said first and said second tubular secondary windings and coaxial with the latter;

third means, comprising a transformer core means of length greater than that of said primary winding and encircled at least in part by said primary winding and said first and second auxiliary windings and arranged for displacement generally along the axis of said secondary windings between first and second extremes of motion;

fourth means connecting one of said auxiliary windings in series with one of said tubular secondary windings and the other of said auxiliary windings in series with the other of said tubular secondary windings;

fifth means, comprising first and second rectifier-filter networks each connected in back-to-back relationship to the other and each connected to a respective one of said secondary windings and the respective series-connected auxiliary winding for energization thereby; and sixth means, comprising indicating means connected across the back-to-back connected first and second rectifier-filter networks, whereby said indicator means indicates the extent and direction of displacement of said core from a null position thereof incident to such displacement and concurent energization of said primary winding.

8. A differential-transformer displacement-transducer comprising:

differential transformer means including axially-aligned spaced-apart principal secondary windings and a primary winding generally therebetween in endwise abutting relation, all disposed in a tubular formation, said transformer means further comprising an elongate reciprocable core of length greater than that of said primary winding and greater than that of either of said secondary windings, said core being arranged for translation between first and second extreme positions within said tubular formation, and said transformer means further comprising first and second auxiliary secondary windings each connected in series with a respective one of said spaced-apart secondary windings and disposed generally therebetween and around respective end portions of said primary winding, whereby there is provided inductively related to said primary winding two sets of secondary windings each set of which comprises a principal secondary winding and an auxiliary winding and a pair of terminals;

first and second rectifier-filter networks connected back-to-back and provided with output terminals, each of said networks being connected to the terminals of a respective one of sets of secondary windings for energization thereby; and circuit means connected to said output terminals to utilize the output of said first and second rectifier-filter networks.

References Cited by the Examiner

UNITED STATES PATENTS

| | | | |
|---|---|---|---|
| 2,640,971 | 6/53 | MacGeorge | 336—30 X |
| 2,985,854 | 5/61 | Brosh | 336—136 X |
| 3,005,969 | 10/61 | Wysocki | 336—30 X |
| 3,017,589 | 1/62 | Chass | 323—48 X |
| 3,054,976 | 9/62 | Lipshutz | 323—48 X |

RALPH D. BLAKESLEE, Acting Primary Examiner.

LLOYD McCOLLUM, Examiner.